US008612275B1

(12) United States Patent
Crum et al.

(10) Patent No.: US 8,612,275 B1
(45) Date of Patent: Dec. 17, 2013

(54) SPREADING ALGORITHM FOR WORK AND TIME FORECASTING

(75) Inventors: James L. Crum, Lenexa, KS (US); Michael W. Kanemoto, Lawrence, KS (US); Mathew E. Perkins, Pleasant Hill, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 2670 days.

(21) Appl. No.: 11/195,964

(22) Filed: Aug. 3, 2005

(51) Int. Cl.
*G06Q 10/00* (2012.01)

(52) U.S. Cl.
USPC .......................... 705/7.13; 705/7.23; 700/100

(58) Field of Classification Search
USPC ................................ 705/7.13, 7.23; 700/100
See application file for complete search history.

(56) References Cited

U.S. PATENT DOCUMENTS

| | | | |
|---|---|---|---|
| 5,408,663 A | 4/1995 | Miller | |
| 5,619,695 A | 4/1997 | Arbabi et al. | |
| 5,907,490 A | 5/1999 | Oliver | |
| 5,953,707 A | 9/1999 | Huang et al. | |
| 6,032,121 A | 2/2000 | Dietrich et al. | |
| 6,216,109 B1 | 4/2001 | Zweben et al. | |
| 6,519,763 B1 | 2/2003 | Kaufer et al. | |
| 6,678,671 B1 | 1/2004 | Petrovic et al. | |
| 6,687,677 B1 | 2/2004 | Barnard et al. | |
| 6,714,915 B1 | 3/2004 | Barnard et al. | |
| 6,993,533 B1 | 1/2006 | Barnes | |
| 7,080,024 B2 | 7/2006 | Thompson | |
| 7,089,193 B2 | 8/2006 | Newbold | |
| 7,139,720 B1 | 11/2006 | Foell et al. | |
| 7,139,999 B2 | 11/2006 | Bowman-Amuah | |
| 7,222,082 B1 | 5/2007 | Adhikari et al. | |
| 7,222,330 B2* | 5/2007 | Bicknell et al. | ............... 717/101 |
| 7,613,623 B2 | 11/2009 | Nemecek et al. | |
| 7,962,358 B1 | 6/2011 | Fernandez et al. | |
| 8,001,226 B2 | 8/2011 | Matsumoto et al. | |
| 8,280,756 B1 | 10/2012 | Kanemoto et al. | |
| 8,341,591 B1 | 12/2012 | Knauth et al. | |
| 2002/0165742 A1 | 11/2002 | Robins | |
| 2003/0018952 A1 | 1/2003 | Roetzheim | |
| 2003/0083891 A1 | 5/2003 | Lang et al. | |
| 2003/0083912 A1 | 5/2003 | Covington et al. | |
| 2003/0126141 A1 | 7/2003 | Hassman et al. | |
| 2004/0001103 A1 | 1/2004 | Fliess et al. | |
| 2004/0073467 A1 | 4/2004 | Heyns et al. | |
| 2004/0078254 A1 | 4/2004 | Piechl et al. | |
| 2004/0111306 A1 | 6/2004 | Yokota et al. | |
| 2004/0117046 A1 | 6/2004 | Colle et al. | |

(Continued)

OTHER PUBLICATIONS

C. Chapman and S. Ward, Constructively Simple Estimating: A Project Management Example, Oct. 2003, The Journal of the Operational research Society, vol. 54, No. 10, p. 1052.*

(Continued)

*Primary Examiner* — Jonathan G Sterrett
*Assistant Examiner* — Stephen S Swartz

(57) ABSTRACT

A method of forecasting work hours per unit of time is provided. The method comprises estimating a project hour budget, determining a percentage of the project hour budget to be expended in each of a plurality of project phases based on average percentages of project hour budgets expended in each project phase in completed projects, and distributing the project hour budget across a plurality of units of time based on the percentage of the project hour budget to be expended in each project phase, on the project hour budget, and on a schedule of project milestones.

17 Claims, 4 Drawing Sheets

(56) References Cited

U.S. PATENT DOCUMENTS

| | | | |
|---|---|---|---|
| 2004/0162748 A1 | 8/2004 | Vogel et al. |
| 2004/0162749 A1 | 8/2004 | Vogel et al. |
| 2004/0162753 A1 | 8/2004 | Vogel et al. |
| 2005/0114829 A1 | 5/2005 | Robin et al. |
| 2005/0114830 A1 | 5/2005 | Knutson et al. |
| 2005/0120332 A1 | 6/2005 | Martin et al. |
| 2005/0137920 A1 | 6/2005 | O'Connor et al. |
| 2006/0010418 A1 | 1/2006 | Gupta et al. |
| 2006/0053043 A1 | 3/2006 | Clarke |
| 2006/0129439 A1 | 6/2006 | Arlt et al. |
| 2006/0167732 A1 | 7/2006 | Ricketts |
| 2006/0235732 A1 | 10/2006 | Miller et al. |
| 2007/0006161 A1 | 1/2007 | Kuester et al. |
| 2007/0073576 A1 | 3/2007 | Connors et al. |
| 2007/0100685 A1 | 5/2007 | Brickhaus et al. |
| 2007/0112945 A1 | 5/2007 | Brown et al. |
| 2007/0179871 A1 | 8/2007 | Minor et al. |
| 2008/0110971 A1 | 5/2008 | Pover et al. |
| 2008/0183549 A1 | 7/2008 | Connors et al. |

OTHER PUBLICATIONS

C. Chapman and S. Ward, Constructively Simple Estimating: A Project Management Example, 2003, Palgrave Macmillan Journals and Operational research Society, vol. 54, No. 10, 1050-1058.*
Reaction Rate, 2007, The Free Dictionary, http://encyclopedia2.thefreedictionary.com/Rate+equation+(chemistry).*
Knauth, Margaret J., et al., Patent Application entitled, "Predictive Growth Burn Rate in Development Pipeline," filed Apr. 13, 2006, U.S. Appl. No. 11/403,669, Specification (27 pgs.) and Drawings (3 sheets).
Knauth, Margaret J., et al., Patent Application entitled, "A Method and Software Tool for Real-Time Optioning in a Software Development Pipeline," filed Apr. 13, 2006, U.S. Appl. No. 11/403,773, Specification (32 pgs.) and Drawings (9 sheets).
Kanemoto, Michael W., et al., Patent Application entitled, "Hardware/Software and Vendor Labor Integration in Pipeline Management," filed Apr. 13, 2006, U.S. Appl. No. 11/403,652, Specification (30 pgs.) and Drawings (6 sheets).
Knauth, Margaret J., et al., Patent Application entitled, "Project Pipeline Management Systems and Methods Having Capital Expenditure/Expense Flip Targeting," filed Apr. 13, 2006, U.S. Appl. No. 11/403,701, Specification (31 pgs.) and Drawings (6 sheets).
Alsup, Lance A., et al., Patent Application entitled, "Project Estimator", filed Jul. 21, 2006, U.S. Appl. No. 11/491,203.
Deltek—Resource Planning and Project Budgeting Software for Professional Consultants: Wind 2, "Wind2 Resource Scheduling and Budgeting (RSB)," http://www.wind2.com/products/rsb.asp, Oct. 12, 2005, Wind2 Software Inc., 8 pgs.
Heires, James T., et al., What I Did Last Summer: A Software Development Benchmarking Case Study, IEEE Software, Sep./Oct. 2001, pp. 33-39.
Lipner, Steve, "The Trustworthy Computing Security Development Cycle," IEEE Security Conference, Dec. 2004, 12 pages.
Musselman, Kenneth, et al., "The Role of Simulation in Advanced Planning and Scheduling," IEEE Simulation Conference 2002, vol. 2, Dec. 2002, pp. 1825-1830.
Pham, Hoang, et al., "Software Cost Model With Warranty and Risk Costs," IEEE Transactions on Computers, vol. 48, No. 1, Jan. 1999, pp. 71-75.
Office Action dated Sep. 16, 2009, U.S. Appl. No. 11/196,692, filed Aug. 3, 2005, 36 pages.
Office Action dated Jun. 9, 2009, U.S. Appl. No. 11/403,701, filed Apr. 13, 2006, 16 pgs.
Final Office Action dated Dec. 18, 2009, U.S. Appl. No. 11/403,701, filed Apr. 13, 2006, 16 pgs.
Office Action dated Mar. 29, 2010, U.S. Appl. No. 11/403,669, filed Apr. 13, 2006, 20 pgs.
Office Action dated Mar. 30, 2010, U.S. Appl. No. 11/403,652, filed Apr. 13, 2006, 26 pgs.
Kanemoto, Michael, W., et al., "Milestone Initial Scheduling," Filing Date—Aug. 3, 2005, U.S. Appl. No. 11/196,692, Specification (23 pgs.), Drawings (3 sheets).
Aoyama, Mikio, "Agile Software Process and Its Experience," Department of Information and Electronics Engineering, IEEE, Niigata Institute of Technology, 1998, pp. 3-12.
Jandourek, Emil, "A Model for Platform Development," Hewlett-Packard Journal, Aug. 1996, pp. 1-18.
Final Office Action dated Apr. 13, 2010, U.S. Appl. No. 11/196,692, filed Aug. 3, 2005, 47 pages.
Armour, Phillip, "Ten Unmyths of Project Estimation," Communications of the ACM, Nov. 2002, vol. 45. No. 11, 4 pgs.
Office Action dated Jun. 8, 2010, U.S. Appl. No. 11/491,203, filed Jul. 21, 2006, 39 pgs.
Cohen, Morris A., et al., "New Product Development: The Performance and Time-to-Market Tradeoff," Management Science, vol. 42, No. 2, Feb. 1996, 15 pgs.
Advisory Action dated Jun. 28, 2010, U.S. Appl. No. 11/196,692, filed Aug. 3, 2005, 3 pgs.
Dean, Burton V., et al., "Multiproject Staff Scheduling with Variable Resource Constraints," IEEE Transactions on Engineering Management, vol. 39, No. 1, Feb. 1992, pp. 59-72.
Pfahl, Dietmar, et al., "Integration of System Dynamics Modeling with Descriptive Process Modeling and Goal-Oriented Measurement," The Journal of Systems and Software vol. 46, 1999, pp. 135-150.
Powell, Anthony, et al. "Strategies for Lifecycle Concurrency and Iteration—A System Dynamics Approach," The Journal of Systems and Software, 1999, vol. 46, pp. 151-161.
Final Office Action dated Sep. 14, 2010, U.S. Appl. No. 11/403,669, filed Apr. 13, 2006, 22 pgs.
Office Action dated Aug. 19, 2010, U.S. Appl. No. 11/403,773, filed Apr. 13, 2006, 31 pgs.
Final Office Action dated Sep. 29, 2010, U.S. Appl. No. 11/403,652, filed Apr. 13, 2006.
Examiner's Answer dated Oct. 5, 2010, U.S. Appl. No. 11/403,701, filed Apr. 13, 2006.
Final Office Action dated Oct. 27, 2010, U.S. Appl. No. 11/491,203, filed Jul. 21, 2006.
Advisory Action dated Nov. 24, 2010, U.S. Appl. No. 11/403,669, filed Apr. 13, 2006.
Final Office Action dated Oct. 4, 2011, U.S. Appl. No. 11/196,692, filed Aug. 3, 2005.
Final Office Action dated Nov. 17, 2011, U.S. Appl. No. 11/403,652, filed Apr. 13, 2006.
Examiner's Answer dated Sep. 12, 2011, U.S. Appl. No. 11/491,203, filed Jul. 21, 2006.
Examiner's Answer dated Sep. 21, 2011, U.S. Appl. No. 11/491,203, filed Jul. 21, 2006.
Leffingwell, Dean, et al., "Tactical Management of Agile Development: Achieving Competitive Advantage," Rally Software Development Corporation, 2004.
Rautiainen, Kristian, et al., "4CC: A Framework for Managing Software Product Development," Helsinki University of Technology, Engineering Management Journal, vol. 14, No. 2, Jun. 2002, pp. 27-32.
Smith, Stephen F., et al., "Scheduling and Visualization," Final Technical Report AFRL-IF-RS-TR-2004-142, Jun. 2004, Carnegie Mellon University.
Office Action dated Mar. 29, 2011, U.S. Appl. No. 11/196,692, filed Aug. 3, 2005.
Final Office Action dated Apr. 27, 2011, U.S. Appl. No. 11/403,773, filed Apr. 13, 2006.
Fox, Mark S., et al. "ISIS—a knowledge-based system for factory scheduling," Expert Systems, vol. 1, No. 1, Jul. 1984.
Final Office Action dated Feb. 9, 2011, U.S. Appl. No. 11/403,773, filed Apr. 13, 2006.
Advisory Action dated Dec. 23, 2010, U.S. Appl. No. 11/403,652 filed on Apr. 13, 2006.
Advisory Action dated Jan. 6, 2011, U.S. Appl. No. 11/491,203, filed Jul. 21, 2006.
Bott, M.F., "Software as a Corporate Asset" IEE Proc-Softw. vol. 147, No. 2, Apr. 2, 2000, 6pgs.

(56) References Cited

OTHER PUBLICATIONS

Lassila, Ora, et. al., "Toward the Development of Flexible Mixed-Initiative Scheduling Tools", Robotics Institute, Carnegie Mellow University, Mar. 15, 1994, 12 pgs.

Smith-Daniels, Dwight E., et al., "Heuristic Scheduling of Capital Constrained Projects", Journal of Operations Management 14, 1996, 14 pgs.

Ulusoy, Gündüz, et al., "A framework for an interactive project scheduling system under limited resources," European Journal of Operational Research 90, 1996, 14 pgs.

Office Action dated May 9, 2012, U.S. Appl. No. 11/403,773, filed Apr. 13, 2006.

Advisory Action dated Jul. 19, 2011, U.S. Appl. No. 11/403,773, filed Apr. 13, 2006.

Office Action dated May 9, 2011, U.S. Appl. No. 11/403,652, filed Apr. 13, 2006.

Decision on Appeal dated Jan. 15, 2013, U.S. Appl. No. 11/403,701, filed Apr. 13, 2006.

Notice of Allowance dated Jun. 7, 2012, U.S. Appl. No. 11/196,692, filed Aug. 3, 2005.

Notice of Allowance dated Aug. 9, 2012, U.S. Appl. No. 11/403,773, filed Apr. 13, 2006.

DELTEK.com Webpages—Deltek Project Planner, Deltek, Mar. 2002, Retrieved from Arhcive.org May 18, 2010.

IBM—Introduction to Portfolio Management IBM, Rational Software, Sep. 2005.

IBM—Rational Portfolio Management—Product Data Sheet IBM, 2004.

Melik, Rudolf, et al., Professional Services Automation—Optimizing Project and Service Oriented Organizations, John Wiley & Sons, 2002.

Wolff, Mario, Project and Project Portfolio Management with SAP, 2002.

Notice of Allowance dated Aug. 6, 2013, U.S. Appl. No. 11/403,652, filed Apr. 13, 2006.

* cited by examiner

SPREADING ALGORITHM FOR WORK AND TIME FORECASTING

CROSS-REFERENCE TO RELATED APPLICATIONS

This application includes subject matter related to U.S. patent application Ser. No. 11/196,692, filed Aug. 3, 2005, entitled "Milestone Initial Scheduling," by Michael W. Kanemoto, et al, which is hereby incorporated by reference for all purposes.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure is directed to manpower forecasting, and more particularly, but not by way of limitation, to a spreading algorithm for work and time forecasting.

BACKGROUND OF THE INVENTION

Development projects in enterprises may include several sub-divisions or tasks to be completed. The work of completing tasks may be divided into several phases, and the several tasks making up a project may be expected to complete each of the phases at the same time. Personnel, for example task team leaders, may estimate the amount of resources needed during the development project so that adequate resources are available to make timely progress in each of the work phases. Resources may include hours to be worked by appropriately skilled developers and/or costs including overhead costs, software tool leasing costs, training costs, and other expenditure costs.

SUMMARY OF THE INVENTION

According to one embodiment, a method of forecasting work hours per unit of time is provided. The method includes estimating a project hour budget. The method includes determining a percentage of the project hour budget to be expended in each of a plurality of project phases based on average percentages of project hour budgets expended in each project phase in completed projects. The method includes distributing the project hour budget across a plurality of units of time based on the percentage of the project hour budget to be expended in each project phase, on the project hour budget, and on a schedule of project milestones.

A system for distributing budget hours is also provided according to another embodiment. The system includes a data store including a project hour budget, a schedule percentage of project hour budget to be expended in each of a plurality of project phases, and a schedule percentage of project duration to be expended in each of the plurality of project phases. The system also includes an analysis tool that generates a distribution of project hours to each of a plurality of periods of duration based on the project hour budget. The distribution of project hours further based on the schedule percentage of project hour budget to be expended in each project phase and the schedule percentage of project duration to be expended in each project phase. The analysis tool also generates a report containing the distribution of project hours to the periods of duration.

According to still other embodiments, a method of forecasting is also provided. The method comprises projecting resource expenditure over each of a plurality of units of time over the course of a project based on a resource budget. The resource expenditure is further based on a definition of a duration of project phases as a percentage of a total project duration, a project start date, a project end date and an estimate of a percentage of resources to be expended during each project phase.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

The number of personnel needed to staff a project or task development effort may vary from one phase to the next phase. Depending on the duration of phases, the staffing levels may vary from one project to the next. In large projects or in large organizations projecting needed staffing levels can be difficult and challenging. Errors in projecting or estimating needs may result in a sudden, unanticipated drop-off of staffing needs that may result in a layoff of surplus personnel. A method and tool of spreading estimated resource consumption across the different phases of a project based on a defined resource consumption schedule for each phase of the task is described below. The consumption schedule employed may be a generic consumption schedule based on averages calculated from actual charged hours and costs from completed projects. Alternatively, a custom consumption schedule may be provided for individual projects to accommodate special characteristics unique to the individual project. By using appropriate consumption schedules to estimate resource consumption in each of the phases of a task greater insight into and understanding of future needs may be obtained, thereby contributing to more reliable achievement of management goals. An insight of the disclosure is that the percentage of project duration expended in different project phases is independent of the percentage of project effort expended in the associated project phases.

Figure 1:
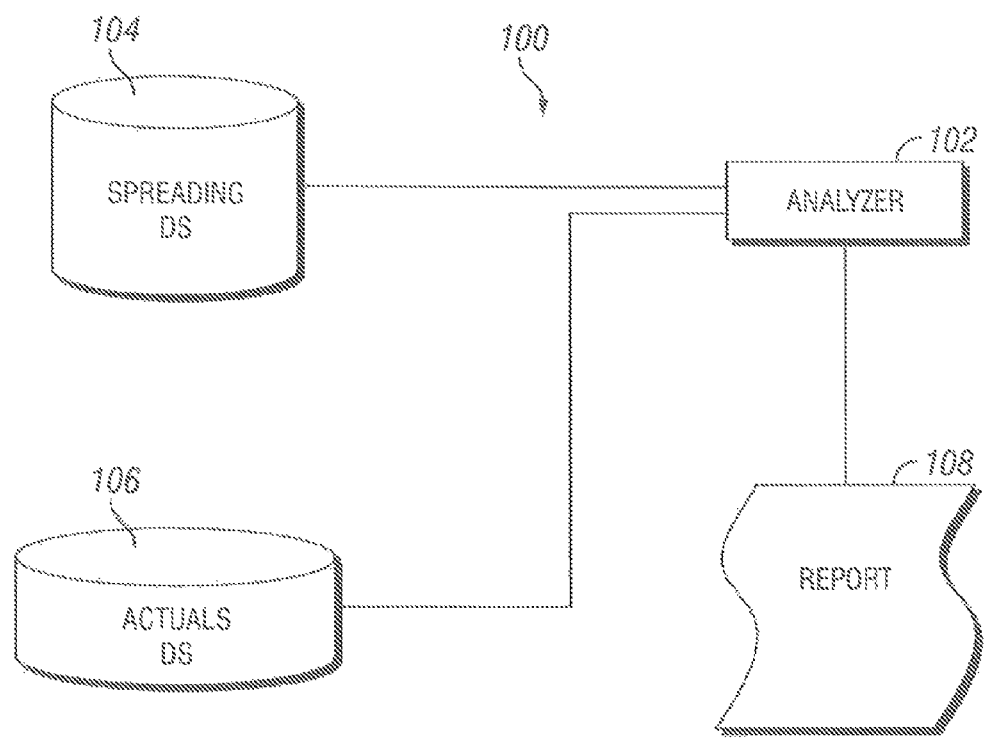
FIG. 1 is a block diagram of a resource spreading system according to an embodiment of the present disclosure.

Turning now to FIG. 1, a block diagram of a system 100 for spreading resource estimates is depicted. The system 100 comprises an analyzer component 102, a spreading data store 104, and an actuals data store 106. The actuals data store 106 stores historical data from completed projects. The analyzer component 102 may be a computer program or application and is suitable to be executed on any general purpose computer system. The spreading data store 104 and the actuals data store 106 may be implemented by using a general purpose computer system. General purpose computer systems are described in greater detail hereinafter.

Figure 2A:
FIGS. 2A, 2B, and 2C depict an exemplary project lifecycle, project schedule, and resource schedule according to an embodiment of the present disclosure.

Turning to FIG. 2A, an exemplary project lifecycle 114 is illustrated. In an embodiment, the project lifecycle 114 may comprise a requirements analysis phase 115, a design phase 116, a development phase 117, and a deployment phase 118. Generally, the main work of the project flows from the requirements analysis phase 115, to the design phase 116, to the development phase 117, and to the deployment phase 118, but some time may be spent in any given phase reworking some of the tasks associated with the previous phases. For example, during the development phase 117, unresolved design and requirements issues may be discovered causing some additional work to be done in both the requirements analysis phase 115 and the design phase 116. The requirements analysis phase 115 is directed to identifying the functional behavior expected and or desired by the project consumer, for example a customer, and identifying appropriate engineering requirements of a system that can provide the desired functional behavior.

The design phase 116 is directed to crafting an architecture or a skeleton of a system that provides the functional behavior. The results of the requirements phase 115 typically provides guidance to the design phase 116 or defines, at a high level, what is to be designed. The design phase 116, for example, may involve identifying a system of cooperating software and/or hardware components, defining the interfaces among these components, defining software tasks, and defining software classes within each software task. The design phase 116 may involve determining a projected processing load of an application and planning how to distribute the processing load across multiple hosts or computers. The design phase 116 may involve identifying a growth path for scaling up the design as the processing load increases over time, for example as corporate accounts increase in number. The design phase 116 typically provides guidance to the development phase 117 or defines what is to be built. The development phase 117 is directed to building a working system in accordance with the design and testing the system in accordance with the requirements. Because the development phase 117 is large, in some embodiments it may be further partitioned into additional phases, for example an implementation phase, a unit test phase, a system integration phase, and a system test phase. The completed system provided by the development phase 117 provides the system that is deployed during the deployment phase 118, for example installing a working system in the facility of a customer. The deployment phase 118 may also include a warranty period during which the enterprise repairs problems in the system reported by users or the customer.

The spreading data store 104 contains project and task information that may be used by the analyzer 102 to determine an estimate or forecast of resource consumption per unit of time. The spreading data store 104 contains a project schedule identifying the duration of each of the phases of the project. The project schedule may include a start date and an end date of the project. The duration of each phase may be defined as a percentage of the project duration.

Figure 2B:
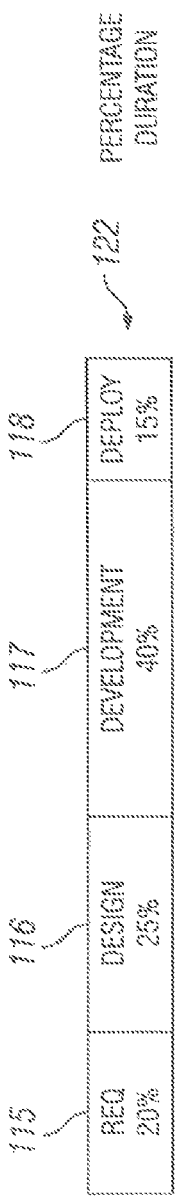

Turning now to FIG. 2B, an exemplary project schedule 122 is illustrated with the percentages of the project duration consumed by each phase. It has been observed that the duration of project phases tend to consume a constant percentage of total project duration or calendar time. This is contrary to expectation in that applying twice as many personnel resources to the task of requirements analysis, for example, may be expected to reduce the duration of the requirements analysis phase by half, but the expected reduction does not occur and in fact the duration may remain substantially unchanged. It may be that fixed time lags associated with interacting with other personnel, for example scheduling meetings, constrain progress.

The percentages may be based on, for example, data from completed projects which is maintained in the spreading data store 104 or actuals data store 106. The requirements analysis phase 115 is depicted as consuming 20% of the duration of the project, the design phase 116 is depicted as consuming 25% of the duration of the project, the development phase 117 is depicted as consuming 40% of the duration of the project, and the deployment phase 118 is depicted as consuming 15% of the duration of the project. In an alternate embodiment, the deployment phase 118 may consume a fixed time duration, for example thirty days. In the fixed time duration deployment phase 118 embodiment, the durations of the remaining project phases are defined as a percentage of project duration exclusive of the deployment phase 118.

The spreading data store 104 also contains a generic task resource consumption schedule identifying the percentage of resources, for example budget hours, that are typically expended during each task phase. It has been observed that the magnitude of effort consumed in each phase of projects, as a percentage of total project effort, tends to be constant and independent from the scale of the project. For example, it may be that approximately twenty percent of project effort is consumed in requirements analysis whether the project is a 10,000 hour project or a 100,000 hour project.

Figure 2C:
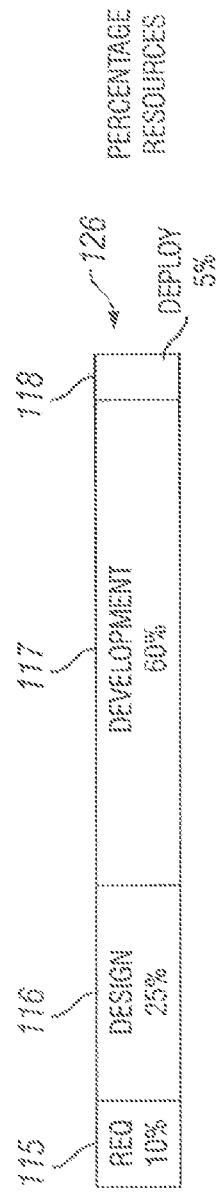

Turning now to FIG. 2C, an exemplary resource schedule 126 is depicted. The requirements analysis phase 115 is depicted as consuming 10% of project resources, the design phase 116 is depicted consuming 25% of project resources, the development phase 117 is depicted consuming 60% of project resources, and the deployment phase 118 is depicted consuming 5% of project resources. The generic task resource consumption schedule is based on a record of resource consumption from previously completed tasks. This information may be generated, for example, by the analyzer component 102 working on information stored in the actuals data store 106.

In a preferred embodiment, the analyzer component 102 selects data of appropriate dates from the actuals data store 106, for example data from the last six months of completed projects. Data contained by the actuals data store 106, for example actual reporting data on hours worked on specific projects, may be stored along with an appropriate indication of the time and date the data was stored, which may be referred to as a time-date stamp of the data. The analyzer component 102 may select from available data in the actuals data store 106 based on the time-date stamp of the data. Older data, for example three year old data, may not be as applicable as more recent data because processes may have changed. It may be that data from special ranges of dates may be deemed extraordinary and/or not typical, for example data from the months of November, December, and/or January when an above average amount of vacation may be consumed by staff. The same generic task consumption schedule may be employed to spread resource estimates for all tasks for a given project.

The spreading data store 104 may contain one or more custom task resource consumption schedules. Some tasks may not conform to the typical resource consumption schedule. For example, an architecture task may consume all of the resources allocated to the task during the requirements analysis and design phases. For example, a project to develop embedded software to execute on a processor adapted to a special environment and employing specialized interfaces may consume more resources in the development phase 117 due to additional system integration activities. Users of the system 100 may define these custom task resource consumption schedules using a spreadsheet program or other data entry mechanism, for example entering an arbitrary percentage for each of the project phases, the sum of the percentages adding up to 100%. The generic task resource consumption schedule, the custom task resource consumption schedules, and the project schedule may be stored as spreadsheets in the spreading data store 104.

The analyzer component 102 generates the resource schedule of resource expenditure per unit of time for one or more tasks. The unit of time, also referred to as periods of duration, may be weeks, months, or some other preferred unit of time. The analyzer component 102 may store the estimated schedules of resource expenditure in the spreading data store 104. The analyzer component 102 may also generate a report 108 including the estimated schedule of resource expenditure for one or more tasks. In an embodiment to generate an estimated schedule or resource expenditure, the analyzer 102 accesses the information stored in the spreading data store 104 and determines the estimated resource consumption per unit time of each phase as:

$$\text{estimate} = \left\{\frac{100}{(P_d)(\varphi_d)}\right\}\left\{\frac{T\varphi_\%}{100}\right\}LOE = \frac{LOE \times T\varphi_\%}{P_d \times \varphi_d} \quad (1)$$

where $P_d$ is the total project duration in an appropriate time unit, $\varphi_d$ is the duration of the subject project phase as a percentage of the total project duration, $T\varphi_\%$ is the percentage of task resources scheduled to be consumed during the subject project phase, and LOE is the total of resources allocated for the subject task. For the deploy-warranty phase, if a fixed time duration is assumed, the fixed duration time expressed in the appropriate units replaces the factor $P_d \times \varphi_d$. In another embodiment, a different equation may be employed. In another embodiment, the equation may be elaborated to take account of different labor rates of different responsibilities and/or non-constant hour consumption schedules within a project phase.

Several exemplary projects are now discussed. In a first exemplary project, the exemplary project schedule 122 is employed. The first project is scheduled to start on January 1, and complete on December 31, and has an estimated level of effort of 400,000 hours. Based on this information, the requirements analysis phase 115 will consume 10.4 weeks, the design phase 116 will consume 13 weeks, the development phase will consume 20.8 weeks, and the deployment phase 118 will consume 7.8 weeks. Assuming the preferred time unit is the week, these phases may be rounded so that the requirements analysis phase 115 will consume 10 weeks, the design phase 116 will consume 13 weeks, the development phase will consume 21 weeks, and the deployment phase 118 will consume 8 weeks. In the first project, the exemplary resource schedule 126 is employed. Based on this information, the requirements analysis phase 115 will consume 40,000 hours, the design phase 116 will consume 100,000 hours, the development phase will consume 240,000 hours, and the deployment phase 118 will consume 20,000 hours. The requirements analysis phase 115 will consume about 4,000 hours per week from January 1 to about March 12, the design phase 116 will consume about 7,692 hours per week from about March 13 to about June 11, the development phase will consume about 11,429 hours per week from about June 12 to about November 5, and the deployment phase 118 will consume about 2,500 hours per week from about November 6 to December 31.

In a second exemplary project, the exemplary project schedule 122 is employed and the exemplary resource schedule 126 is employed, but the development phase is sub-divided into a coding sub-phase that consumes 70% of both development time and level of effort, a unit testing sub-phase that consumes 10% of both development time and level of effort, and a system testing sub-phase that consumes 20% of both development time and level of effort. Based on this information, the coding sub-phase will consume about 11,200 hours per week from about June 12 to about September 24, the unit test sub-phase will consume about 11,400 hours per week from about September 25 to about October 8, and the system test sub-phase will consume about 11,400 hours per week from about October 9 to about November 5. The dates and weekly hour consumption rate for the other project phases remains unchanged. In the second project, the percentages for duration and resource consumption of the sub-task phases are identical, but in other embodiments different percentages may be employed.

In a third exemplary project, the deployment phase 118 is a fixed 30 day interval. In the third project the project schedule allocates 25% of the schedule to the requirements analysis phase 115, 35% of the schedule to the design phase 116, and 40% of the schedule to the development phase for a total of 100%. The third project is scheduled to start on January 1 and to complete, through the end of the development phase 117, by about November 30. The third project has an estimated level of effort of 400,000 hours and uses the exemplary resource schedule 126. Based on this information, the requirements analysis phase 115 will consume about 40,000 hours over about 12 weeks at a rate of about 3,333 hours per week. The design phase 116 will consume about 100,000 hours over about 17 weeks at a rate of about 5,882 hours per week. The development phase 117 will consume about 240,000 hours over about 19 weeks at a rate of about 12,632 hours per week. The Deployment phase 118 will consume about 20,000 hours over 30 days at a rate of about 5,000 hours per week.

In a fourth exemplary project is similar to the first exemplary project, except that a custom resource schedule 126 is employed. The custom resource schedule 126 calls for using 60% of hour resources in the requirements analysis phase 115 and 40% of hour resources in the design phase 116. This custom resource schedule 126 may apply, for example, for an architecting project or an architecting portion of a project. The fourth exemplary project is scheduled to start January 1, complete about June 11, and consume about 6,000 hours. Based on this information, the requirements analysis phase 115 will consume about 3,600 hours from January 1 to about March 12 at a rate of about 360 hours per week. The design phase 116 will consume about 2,400 hours from about March 13 to about June 11 at a rate of about 171 hours per week.

Figure 3:
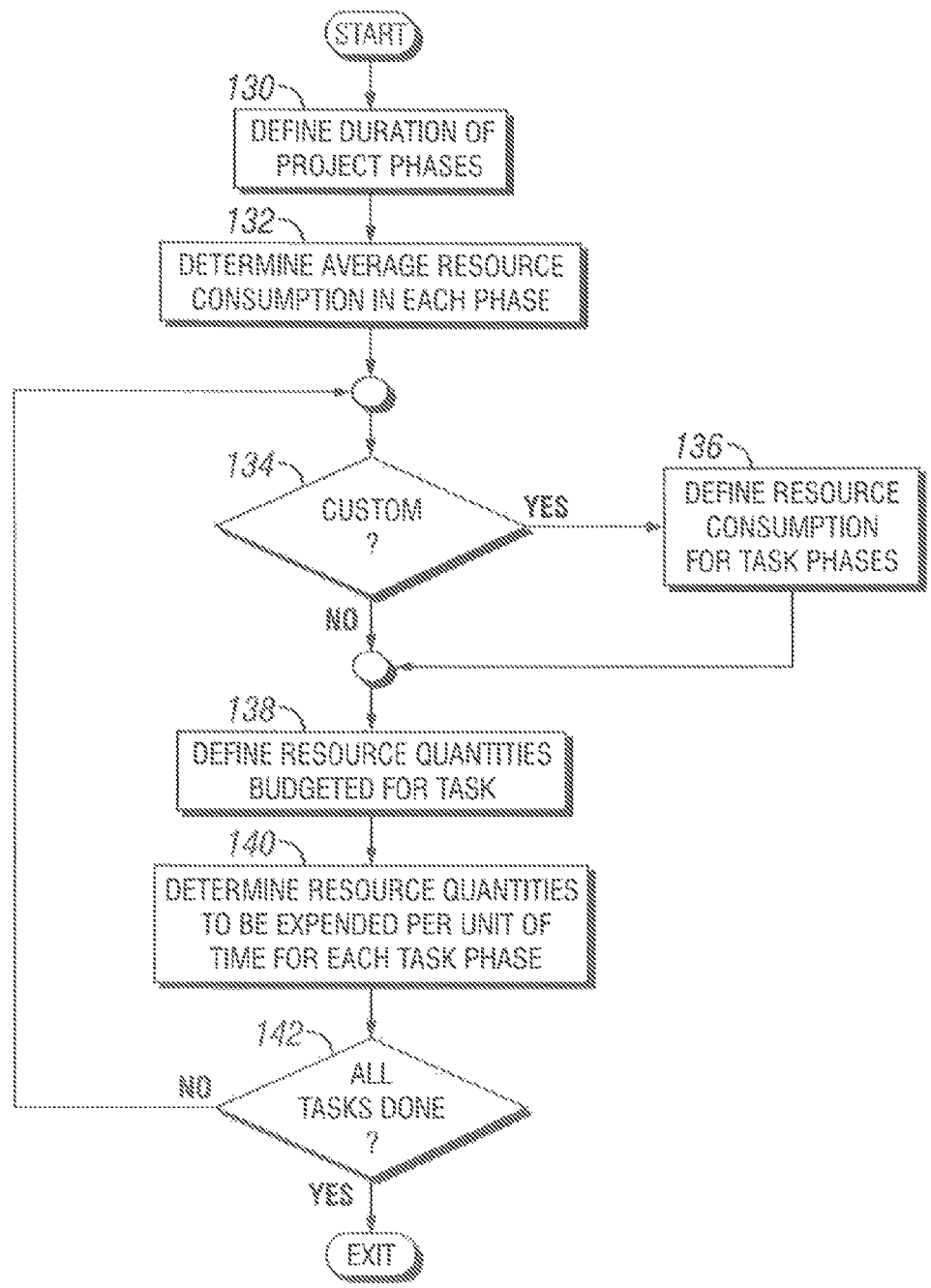
FIG. 3 is a logic flow diagram of a process suitable for practicing embodiments of the present disclosure.

Turning now to FIG. 3, a process of estimating the resource consumption per unit time for each phase of tasks associated with a project is depicted. In block 130 a duration of the phases of the project are defined. This definition may take the form of a project start date, a project end date, and a definition of what percentage of project duration is consumed in each phase. This information may be stored in a spreadsheet. In an embodiment, the durations of the project phases may be used to determine project schedule milestone dates, for example an end of the requirements analysis phase 115, an end of the design phase 116, an end of the development phase 117, and an end of the deployment phase 118.

The process proceeds to block 132 where the average resource consumption per project phase is determined based on historical data, for example by analyzing the data contained by the actuals data store 106. The results may be expressed as percentages of total project duration in order to make the results more readily applicable to projects having different lengths. This may be referred to as a generic task resource consumption schedule. The actuals used to determine the averages may be selected from a desirable time period to be representative of current processes.

The process proceeds to block 134 where if a custom task resource consumption schedule is desired the process proceeds to block 136 where the custom task resource consumption schedule is defined, as for example by entering data into a spreadsheet. The process proceeds to block 138 where the total amount of resources budgeted for the task, for example a level-of-effort estimate, is defined. The process proceeds to block 140 where the resources to be expended per unit of time for each phase of the subject task are determined and stored. The determination is based on the task resource consumption schedule that applies, either the generic task resource consumption schedule or the custom task resource consumption schedule. The determination is also based on the total amount of resources allocated for the task, and the durations of the project phases. The determination of resources to be expended per unit of time for each phase is stored in the spreading data store 104 for each task.

The process proceeds to block 142 where if more tasks remain to have their resource consumption per unit time determined, the process returns to block 134. When all tasks have had their resource consumption per unit time determined the process exits. In an embodiment, a final report exhibiting the estimated resource expenditure per unit of time for each phase for all the tasks is generated before the process exits. The unit of time, also referred to as periods of duration, may be weeks, months, or some other preferred unit of time.

Figure 4:
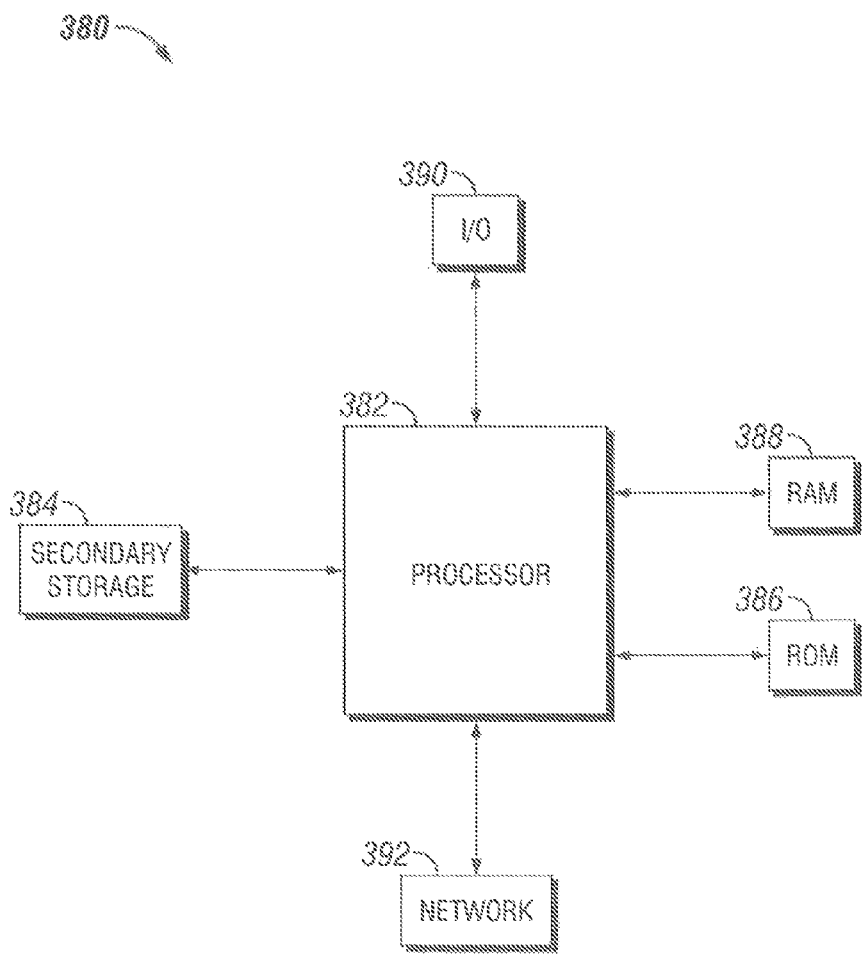
FIG. 4 illustrates an exemplary general purpose computer system suitable for implementing the several embodiments of the disclosure.

The system described above may be implemented on any general-purpose computer with sufficient processing power, memory resources, and network throughput capability to handle the necessary workload placed upon it. FIG. 4 illustrates a typical, general-purpose computer system suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) 390 devices, and network connectivity devices 392. The processor may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage. The RAM 388 is used to store volatile data and perhaps to store instructions. Access to both ROM 386 and RAM 388 is typically faster than to secondary storage 384.

I/O 390 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 392 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 392 devices may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity 392 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A method of forecasting work hours per unit of time, comprising:
   estimating a total project hour budget for a project comprising a plurality of project phases;
   determining, with an analyzer stored as a set of computer readable instructions in a computer readable storage media and executable by a processor, a percentage of the total project hour budget to be expended in each of the plurality of project phases based on average percentages of project hour budgets expended in each project phase in completed projects; and
   distributing, with the analyzer, the project hour budget across a plurality of units of time based on the percentage of the project hour budget to be expended in each project phase, on the project hour budget, and on a schedule of project milestones, wherein distributing, with the analyzer, the project hour budget across each project phase is based on:

$$\text{estimate} = \left\{\frac{100}{(P_d)(\varphi_d)}\right\}\left\{\frac{T\varphi_\%}{100}\right\}LOE = \frac{LOE \times T\varphi_\%}{P_d \times \varphi_d} \quad (1)$$

where $P_d$ is a total project duration, $\phi_d$ is a percentage of the total project duration expended in each project phase, $T\phi_\%$ is the percentage of the project hour budget to be expended in each project phase, and LOE is the total project hour budget for the project.

2. The method of claim 1 wherein the schedule of project milestones is defined by a start date, an end date, and the percentage of the total project duration expended in each project phase.

3. The method of claim 2 wherein a warranty phase is defined as a fixed number of days.

4. The method of claim 1 wherein the project phases include one or more phases selected from the group consisting of a requirements analysis phase, a design phase, a development phase, an implementation phase, and a warranty phase.

5. The method of claim 1 wherein the percentage of project hour budget to be expended in each project phase is custom defined.

6. A system for distributing budget hours, comprising:
   at least one processor;
   a data store including:
      a project hour budget;
      one or more schedule percentage of project hour budget to be expended in each of a plurality of project phases; and
      a schedule percentage of project duration to be expended in each of the plurality of project phases wherein the schedule percentage of project duration for a one of the plurality of project phases is independent of the schedule percentage of project hour budget for the one of the plurality of project phases; and
   an analysis tool stored as a set of computer readable instructions in a computer readable storage media and executable by the least one processor, to generate a distribution of project hours to each of a plurality of periods of duration based on the project hour budget, the distribution of project hours further based on the schedule percentage of project hour budget to be expended in each project phase and the schedule percentage of project duration to be expended in each project phase, the analysis tool further operable to generate a report containing the distribution of project hours to the periods of duration, wherein the definitions of the percentage of project hour budget to be expended in each of a plurality of project phases and the definition of the percentage of project duration to be expended in each of the plurality of project phases are included in the report.

7. The system of claim 6 wherein one of the definitions of the percentage of project hour budget to be expended in each project phase: 1) is based at least in part on averages of hours spent or expended in project phases for completed projects; 2) is a custom definition; or 3) is based on at least in part on averages of hours expended in each of the plurality of project phases.

8. The system of claim 7 wherein a warranty phase is defined to have a duration of a fixed number of days.

9. A method of forecasting, comprising:
   projecting, with an analyzer stored as a set of computer readable instructions in a computer readable storage media and executable by a processor, resource expenditure over each of a plurality of units of time over the course of a project based on a resource budget, the resource expenditure further based on a definition of a duration of project phases as a percentage of a total project duration, a project start date, a project end date and an estimate of a percentage of resources to be expended during each project phase wherein the definition of a duration of project phases is independent from the percentage of resources to be expended during each project phase, wherein projecting, with the analyzer, the resource expenditure across each project phase is based on:

$$\text{estimate} = \left\{\frac{100}{(P_d)(\varphi_d)}\right\}\left\{\frac{T\varphi_\%}{100}\right\}LOE = \frac{LOE \times T\varphi_\%}{P_d \times \varphi_d} \quad (1)$$

where $P_d$ is the total project duration, $\phi_d$ is the percentage of the total project duration expended in each project phase, $T\phi_\%$ is the percentage of the resources to be expended in each project phase, and LOE is the resource budget.

10. The method of claim 9 wherein the estimate of a percentage of resources to be expended during each project phase is based at least in part on a determination of an average percentage of resources expended during project phases of projects completed over the previous about six months.

11. The method of claim 9 wherein the estimate of the percentage of resources to be expended during each project phase is customized for the specific task.

12. The method of claim 9 wherein the project phases are selected from the group consisting of a requirement analysis phase, a design phase, a development phase, a deploy-migration phase, and a deploy-warranty phase.

13. The method of claim 12 wherein the duration of the deploy-warranty phase is a fixed length of time.

14. The method of claim 9 wherein the units of time are one of weeks or months.

15. The method of claim 1, wherein the completed projects comprise a sub-set of all completed projects.

16. The method of claim 15, wherein the sub-set of all completed projects is selected based on a time-date stamp of all completed projects.

17. The system of claim 6, wherein the analysis tool generates the distribution of the project hour budget to each project phase based on:

$$\text{estimate} = \left\{\frac{100}{(P_d)(\varphi_d)}\right\}\left\{\frac{T\varphi_\%}{100}\right\}LOE = \frac{LOE \times T\varphi_\%}{P_d \times \varphi_d} \qquad (1)$$

where $P_d$ is a total schedule project duration, $\phi_d$ is the schedule percentage of the total project duration expended in each project phase, $T\phi_\%$ is the schedule percentage of the project hour budget to be expended in each project phase, and LOE is the project hour budget.

* * * * *